2,810,656
Patented Oct. 22, 1957

2,810,656
ZEIN WATER EMULSION

Clifford J. McDowell, Library, Pa., assignor to Corn Products Refining Company, New York, N. Y., a corporation of New Jersey No Drawing. Application September 21, 1953,
Serial No. 381,470

4 Claims. (Cl. 106—153)

This invention relates to a high solids zein water emulsion, substantially neutral, low in viscosity, and to a process for the preparation thereof. More particularly, it relates to zein water emulsions containing water-insoluble plasticizers.

Aqueous zein dispersions containing water-insoluble plasticizers and other adjuncts have been used in coating paper and in impregnating paper, but their use has been limited because of their low solids and alkaline character. Some of the adjuncts used, as well as, in some instances, the paper itself, are sensitive to alkaline materials. In order to prepare aqueous-zein dispersions containing water-insoluble plasticizers of the prior art, it has been necessary to use an alkaline material to disperse the zein, a pH of at least 10.5, and usually higher, being necessary. Adjustment of the pH to 7 or lower resulted in the precipitation of zein from the dispersion. Films made from zein dispersions having a pH of 8.5 are cloudy or hazy and grainy. In addition to the aforementioned disadvantages, the amount of zein which can be practically dispersed by prior art methods is limited to about 16 percent, a distinct disadvantage where high solids coatings are desired. The use of heat would increase the amount of zein dispersed but the dispersion would be too viscous for practical applications and would not then be stable, the viscosity increasing to the point where a gel forms.

The principal object of this invention is to provide a process for the production of a zein water emulsion which is essentially neutral and contains a high concentration of zein solids and has a low viscosity. Other objects will appear hereinafter.

I have discovered that zein can actually be emulsified in a substantially neutral aqueous system. This discovery represents a decided improvement over the alkaline aqueous zein dispersions or low solids neutral dispersions of the prior art.

The following specific examples give instances of the reduction to practice of the invention in certain preferred embodiments. It will be understood, however, that such examples are purely typical and illustrative and in no way limit the scope of the invention.

Example I

These formulations are suitable for coating papers.

| | A | B |
|---|---|---|
| Zein parts by weight | 100 | 100 |
| Staybelite resin do | 20 | 20 |
| Oleic acid do | 20 | 20 |
| Propylene glycol do | 10 | 10 |
| Xylene do | 20 | |
| Aqueous ammonia (28%) do | 2 | 2 |
| Water do | 180 | 200 |

Example II

These formulations are suitable for greaseproof coatings and general protective continuous films.

| | A | B |
|---|---|---|
| Zein parts by weight | 100 | 100 |
| Santicizer 8 do | 60 | 50 |
| Oleic acid do | 20 | 20 |
| Tricresyl phosphate do | 20 | 20 |
| Butyl acetate do | | 15 |
| Aqueous ammonia (28%) do | 30 | |
| Water do | 2 | 2 |
| | 170 | 200 |

Example III

These formulations are suitable for pigment binding for decorative or protective coatings or binders.

| | A | B |
|---|---|---|
| Zein parts by weight | 100 | 100 |
| Tall oil do | 50 | 50 |
| Xylene do | 30 | |
| Aqueous ammonia (28%) do | 2 | 2 |
| Water do | 320 | 350 |
| Pigment [1] do | 150 | 150 |

[1] Pigment can be of the inert or filler type such as clay, lithopone, $TiO_2$, etc., or as organic or inorganic coloring materials such as chrome yellow, iron blue, lithol reds, etc. The pigment weight can be increased or decreased as desired.

In each example the process is as follows:

Half of the water at a temperature below 40° C. is added to a mixer followed by half the ammonia and the other ingredients except the zein. All additions are made while under thorough agitation. Heat is then applied until a temperature of between 60 and 70° C. has been reached at which point the zein is added at a rate that will result in immediate wetting. Heating is then discontinued and the balance of the ammonia added. When a particle-free viscous mixture has been obtained indicative of complete hydration of the zein, the balance of the water (the temperature thereof not exceeding about 40° C.) is added slowly until a phase reversal takes place. (An indication of a good emulsion is when reversal takes place on the addition of 30 to 40 parts of the remaining water.) Dilution beyond this phase-reversal point can be at the user's discretion. The most stable emulsions, however, are obtained with about the total amount of water specified in the examples. When storage of the emulsion is contemplated, mixing should be continued until the temperature has dropped to about 40° C. Where the emulsion is to be applied hot (40 to 50° C.), it may be used immediately after reversal and dilution to desired solids.

The pH of the final emulsions was about 7.2 to 7.5 and the pH should not exceed about 7.5. In the examples, the pH before the zein was added varied from 7.9 to 8.5 and after the zein was added, the pH leveled off to 7.2 to 7.5.

In addition to the zein, it is necessary, as mentioned previously, to add certain adjuncts to the formulation to impart water resistance, flexibility, etc. A large variety of water-insoluble plasticizers are satisfactory, such as those containing free carboxyl groups, e. g., rosins, resins or fatty acids; mono- or di-esters, such as monomethyl azeleate and dibutyl tartrate; sulfonamides, such as N-ethyl para toluene sulfonamide, mixture of ortho and para N-ethyl toluene sulfonamides, mixture of ortho and para toluene sulfonamides sold by Monsanto Chemical Company under the trademarks "Santicizer 3," "Santicizer 8" or "Santicizer 9" respectively; the poorly water-soluble rosin amines sold under the trademarks "Rosin Amine D" i. e. hydroabietylamine and "Rosin Amine D" acetate by Hercules Powder Company. Water-soluble, high boiling zein solvents and plasticizers, such as the glycols, can be tolerated to a limited extent, especially to modify the polarity of the plasticizer, as when a rosin and fatty acid mixture is used for extension and plasticization. The minimum total plasticizer mixture appears to be 40 parts per 100 of zein for a group such as the sulfonamides. A total of 50 parts per 100 of zein is about the minimum when a mixture of 20 parts rosin acids, 20 parts fatty acid and 10 parts of glycol is used for extension and plasticization.

In order to prepare the zein emulsion, a soap dispersing agent is necessary. Although there are many such agents available not all are satisfactory if water resistant products are to be produced from the zein emulsion. Ammonium soaps are the preferred dispersing agents and they may be added as such or formed in situ. Ammonium oleate and monoethylamine oleate are examples of satisfactory soaps. A minimum of between 10 and 12 parts of soap is necessary to emulsify 100 parts of zein and a plasticizer or resin mixture. No maximum level was obviously determined since severe foaming resulted. Synthetic detergents, wetting agents or emulsifiers of the salt-free anionic type normally suggested as being compatible with zein also proved to increase foaming tendency unless an organic non-solvent for zein was present.

In applications where volatile solvents can be tolerated, the addition of 10 to 40 parts by weight per 100 of zein of an organic zein non-solvent during the zein emulsification will not only eliminate the foaming tendency normally associated with many synthetic resin emulsions, but improves the stability against viscosity increase of the finished zein emulsion. These solvents must evaporate with or before the water during the drying cycle—otherwise film clarity will be reduced. Butyl acetate is an example of a zein non-solvent of the ester type that is a very effective stabilizing agent. Aromatic or aliphatic hydrocarbons such as xylol or low boiling (100–125° C.) naphthas can also be tolerated especially where heat is used to dry the coating.

I claim:

1. A substantially neutral aqueous zein emulsion of the thin "oil in water type" consisting of 100 parts of zein emulsified in a mixture of at least 40 parts of a water insoluble plasticizer, 10 to 15 parts of ammonium soap and 150 to 200 parts of water, said parts being by weight; said plasticizer being selected from the group consisting of hydrogenated rosin, a mixture of ortho and para N-ethyl toluene sulfonamides, tricresyl phosphate, oleic acid, tall oil, xylene, and butyl acetate.

2. A substantially neutral aqueous zein emulsion of the thin "oil in water" type consisting of 100 parts of zein emulsified in a mixture of at least about 40 parts of a water insoluble plasticizer selected from the group consisting of hydrogenated rosin, mixture of ortho and para N-ethyl toluene sulfonamides, tricresyl phosphate, oleic acid, tall oil, xylene, and butyl acetate, and 10 to 15 parts of ammonium soap, 10 to 40 parts of volatile organic non-zein solvent selected from the group consisting of xylene, propylene glycol and butyl acetate and 150 to 200 parts of water, said parts being by weight.

3. A process of making an aqueous zein emulsion of the thin "oil in water" type which comprises making a dispersion of an insoluble plasticizer selected from the group consisting of hydrogenated rosin, mixture of ortho and para N-ethyl toluene sulfonamides, tricresyl phosphate, oleic acid, tall oil, xylene, and butyl acetate, in water containing an ammonium soap, adding zein thereto at a temperature of about 60 to about 70° C. to hydrate the zein and form a particle free viscous mass, the pH not exceeding about 7.5 and thereafter adding sufficient water until a phase reversal takes place and a thin "watery" emulsion forms, the temperature of the water last added not exceeding about 40° C.

4. Process according to claim 3 wherein the ratio of zein to water in the dispersion is about 1 to 1.5 to 2.0.

References Cited in the file of this patent

UNITED STATES PATENTS

| | | |
|---|---|---|
| 2,247,351 | Drewsen et al. | July 1, 1941 |
| 2,340,913 | Weber | Feb. 8, 1944 |
| 2,360,081 | Stewart | Oct. 10, 1944 |
| 2,377,237 | James | May 29, 1945 |